United States Patent

[11] 3,549,181

| [72] | Inventor | Donald J. Larson<br>P.O. Box 161, Arlington Heights, Ill. 60006 |
|---|---|---|
| [21] | Appl. No. | 724,171 |
| [22] | Filed | Apr. 25, 1968 |
| [45] | Patented | Dec. 22, 1970 |

[54] COUPLING FOR A SPIRALLY SEAMED PIPE
1 Claim, 4 Drawing Figs.

[52] U.S. Cl. .................................................. 285/390, 285/369, 285/417
[51] Int. Cl. ................................................ F16l 15/00
[50] Field of Search .......................................... 285/390, 369, 392, 391, 394, 424, (Corrug. Digest), 374, 355, 404, 417, 418; 138/109, 89, 154, 157, 158; 137/(Inquired); 251/(Inquired); 74/424.5, 424.8

[56] References Cited
UNITED STATES PATENTS

| 173,905 | 2/1876 | Coe | 285/424X |
| 1,904,675 | 4/1933 | Boyer | 285/390 |
| 1,962,428 | 6/1934 | Colbie | 285/424X |
| 2,241,245 | 5/1941 | Daniels | 285/Corrug. Dig. |
| 2,900,200 | 8/1959 | Umstadter | 285/369X |
| 3,028,180 | 4/1962 | Smith | 285/369X |
| 2,530,700 | 11/1950 | Jewell et al. | 285/369X |
| 3,454,291 | 7/1969 | Goldsobel et al. | 285/404X |

*Primary Examiner*—David J. Williamowsky
*Assistant Examiner*—Wayne L. Shedd
*Attorney*—Edward C. Threedy ABSTRACT: A tubular coupling for the mating ends of the pipe constructed out of spirally formed metallic sheets having a continuous spirally extending external seam threadable into helical grooves formed in the internal bore surface of the coupling with the grooves radially located 180° from each other and extending inwardly from opposite open ends of the coupling.

PATENTED DEC 22 1970
3,549,181
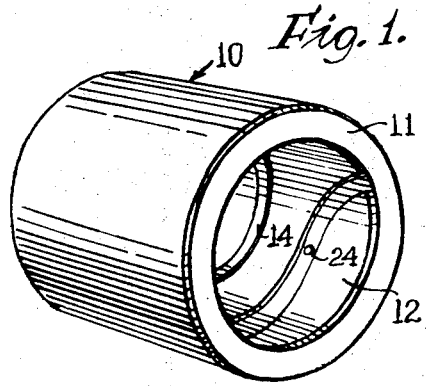
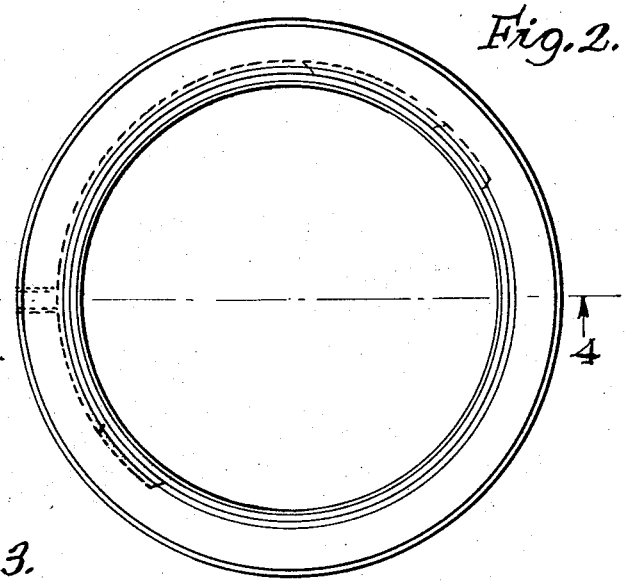
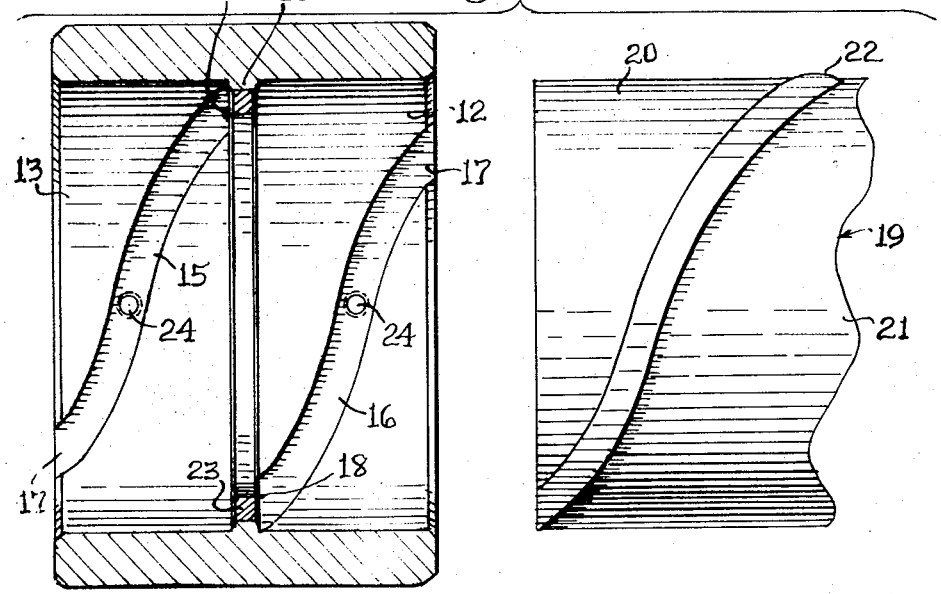
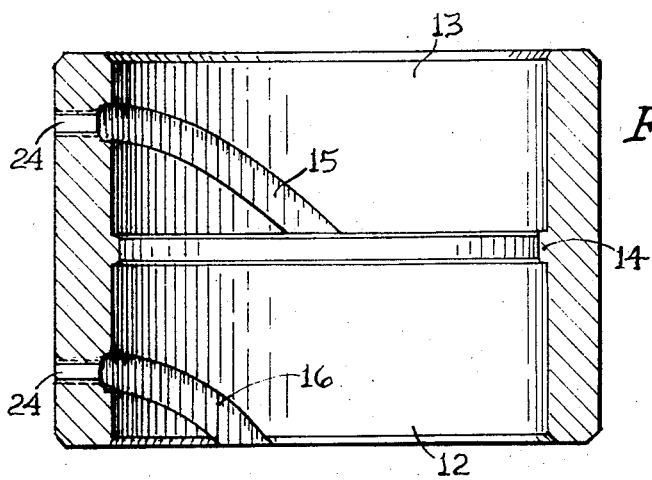
INVENTOR
DONALD J. LARSON
BY Edward C. Phreedy
HIS ATTORNEY.

COUPLING FOR A SPIRALLY SEAMED PIPE

SUMMARY OF THE INVENTION

The invention relates to a coupling for an externally spirally seamed pipe, and its principal object is to provide a simple yet positive connection between pipe sections having on their circumferences a continuous spirally extending radial seam or bead, which is threadable into complementary helical grooves formed in the cylindrical internal surface of the coupling.

The invention will be best understood by reference to the accompanying drawing in which there is shown the preferred embodiment of the invention and in which:

FIG. 1 is a perspective view of the improved coupling;

FIG. 2 is an end elevational view of the coupling;

FIG. 3 is a detailed sectional view of the coupling; and a fragmentary end section of a pipe to be threaded therein; and FIG. 4 is a detailed sectional view taken on line 4-4 of FIG. 2.

Referring to FIG. 1 there is shown the improved coupling 10 which comprises a tubular sleeve 11 having inner compartments 12 and 13 separated by a circumferentially extending inner rib 14.

The compartments have cylindrical bores of uniform cross sections, and each bore has formed therein a helical groove 15 and 16, with the grooves extending outwardly from the inner rib 14 in opposite directions. Each of the helical grooves 15 and 16 has a point of commencement 17 at the outer opposite edges of the sleeve 11, and a point of termination 18 adjacent to the rib 14, with each respective commencement and termination point radially located 180° from each other as seen in FIG. 3.

As clearly shown in FIG. 3 the grooves 15 and 16 are relatively short, and, as such, extend only about one-half the distance around the circumferences of the compartments.

Referring to FIG. 3 there is fragmentarily shown one end of a pipe 19 which is constructed from continuous spirally arranged sections 20 and 21 having their mating edges forming a spirally contoured external bead 22 which corresponds and is complementary to the helical grooves 15 and 16 of the coupling 10. The pipe 19 as seen in FIG. 3 may be rotated about its longitudinal axis with its seam or bead 22 threadably projected into the groove 16 of the compartment 12 of the coupling 10. A corresponding opposite end of a like pipe section (not shown) can have its seam or bead threaded into the groove 15 of the compartment 13 of the coupling 10 thus forming a continuous pipe section. It may be desirous to insert an O-ring 23 of a size to fit on the internal rib 14 to perfect a seal between the pipe sections within the coupling 10.

Formed in the sidewall of the casing 11 and on a center line of each of the grooves 15 and 16 is a screw receiving aperture 24. By this arrangement when the pipe ends 19 are threaded into their respective compartments 12 and 13 with their seam or bead 22 threaded into the respective grooves 15 and 16 a setscrew may be threaded into the apertures 24 and will bear on the seam or bead 22 with sufficient force so as to fixedly connect the pipe sections to the coupling 10. No damage to the pipe 19 will be incurred by the setscrew because the seam or bead 22 by reason of its thickness represents a reinforced body portion.

In practice it has been found that a coupling having a length of 3½ inches, with equal compartments can connect 4-inch pipe sections together when each pipe section is so constructed that the lead of the seam 22 is approximately 5 inches, with the seam having a width, height, and radius equal to the width, height, and radius of the helical grooves 15 and 16 formed in the compartments 12 and 13 of the coupling 10.

From the foregoing it is apparent that I have provided a coupling which is simple in construction and highly efficient in use, and one that is readily adaptable for use with a spirally seamed pipe and the like.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. A coupler for joining opposite ends of pipes having spirally extending external seams comprising:

a. a sleeve having an outer diameter greater than the outer diameter of the pipes including their external seams and a cylindrical bore having a diameter substantially equal to the diameter of the pipes less their external seams;

b. an internal rib having a diameter less than the outer diameter of the pipes, integrally formed on the cylindrical walls of said sleeve, dividing its bore into equal compartments for threadably receiving in either end equal lengths of pipes to be connected thereby;

c. a helical groove formed in the cylindrical walls of each compartment, with each of the grooves extending inwardly of its compartment from opposite ends of said sleeve and terminating at said internal rib at points radially disposed 180° from each other for threadably receiving the external spiral seams of the pipes rotatably projected into opposite ends of said sleeve;

d. a pair of threaded apertures formed in said sleeve, each in open communication with one of said grooves intermediate its ends and in longitudinal alignment with respect to each other; and e. said screws threadable into said apertures and into said grooves and in contact with the external spiral seams of the pipe ends projected therein to prevent rotatable withdrawal of the pipe ends from their respective compartments within said sleeve.